United States Patent [19]

Blough

[11] Patent Number: 5,194,144

[45] Date of Patent: Mar. 16, 1993

[54] APPARATUS FOR AERATION OF SEPTIC TANKS

[75] Inventor: Ronald S. Blough, Fairfield, Iowa

[73] Assignee: Sewage Aeration Systems, Inc., Lockridge, Iowa

[21] Appl. No.: 687,373

[22] Filed: Apr. 18, 1991

[51] Int. Cl.⁵ .............................................. B01F 3/04
[52] U.S. Cl. ................................... 210/85; 210/219; 210/532.2; 261/84; 261/93
[58] Field of Search ................... 210/85, 91, 138, 139, 210/219, 220, 251, 532.2; 261/77, 84, 93, 121.1

[56] References Cited

U.S. PATENT DOCUMENTS

| | | | |
|---|---|---|---|
| 3,677,229 | 7/1972 | Blough et al. | 119/16 |
| 3,778,233 | 12/1973 | Blough et al. | 23/259.1 |
| 3,796,414 | 3/1974 | Winton | 261/84 |
| 3,810,548 | 5/1974 | Blough | 210/242 |
| 3,939,073 | 2/1976 | Bats | 210/219 |
| 4,608,157 | 8/1986 | Graves | 210/532.2 |
| 4,686,045 | 8/1987 | McKee | 210/532.2 |
| 4,732,682 | 3/1988 | Rymal | 210/219 |
| 4,954,295 | 9/1990 | Durda | 261/93 |

Primary Examiner—Thomas Wyse
Attorney, Agent, or Firm—Zarley, McKee, Thomte, Voorhees & Sease

[57] ABSTRACT

An improved aeration device for septic tanks which allows fine bubbles of air to aerate waste material in the tank so that aerobic bacteria may fully perform their decomposing function. Air enters the upper end of a shaft and exists adjacent a propeller. The propeller is protected from interfering with its bubble formation action by a guard bushing concentrically positioned in the air tube so that typical non-organic waste adulterants such is plastic and rubber materials, that are often found in septic tanks, are not drawn into the propeller to interfere with its action.

8 Claims, 1 Drawing Sheet

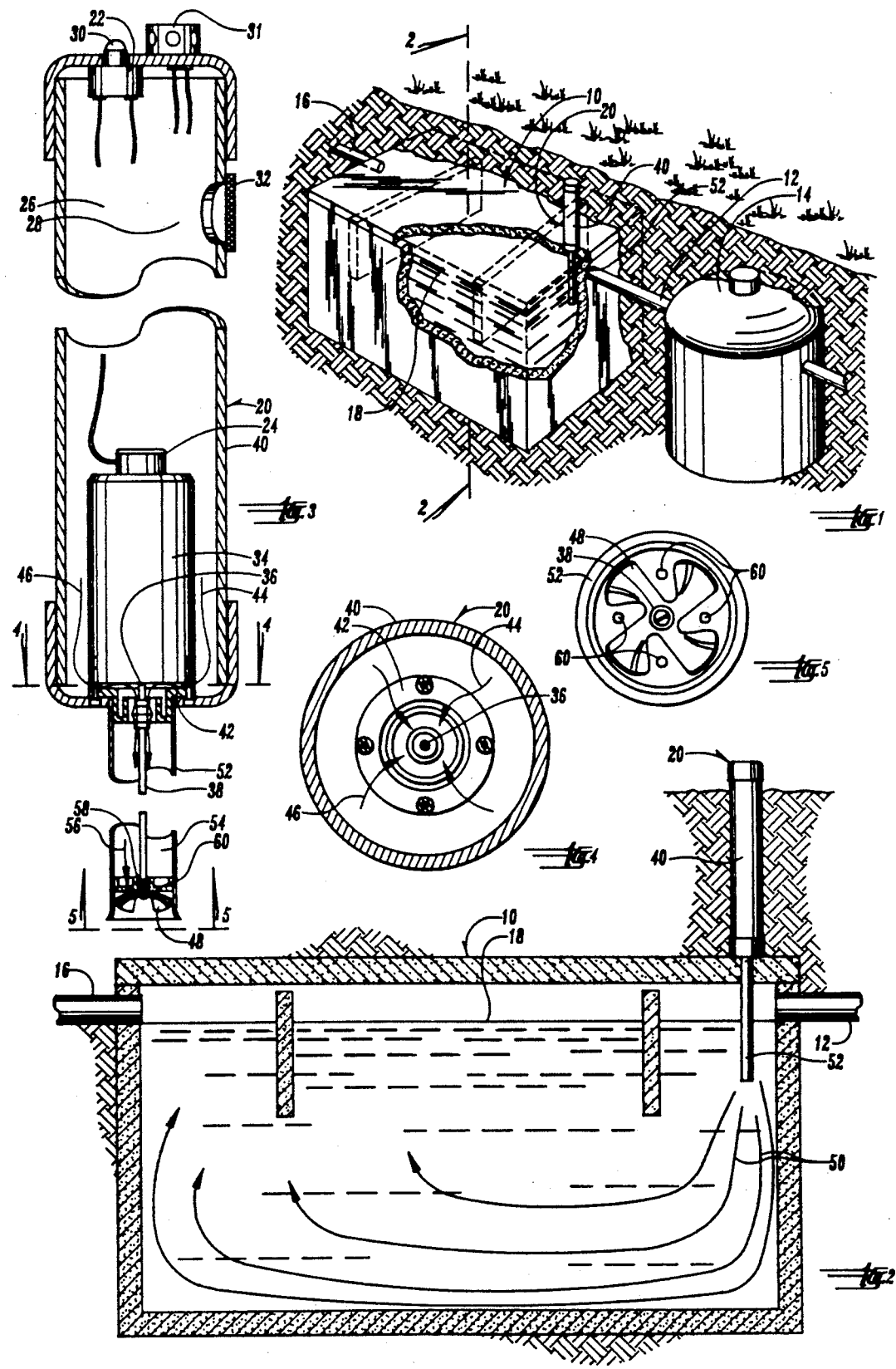

APPARATUS FOR AERATION OF SEPTIC TANKS

BACKGROUND OF THE INVENTION

This invention generally relates to a device for improved aeration for septic tanks and the like.

Bacterial breakdown of sewage waste material is essentially performed by one of two basic processes, namely an aerobic process and an anaerobic process. The aerobic process requires oxygen for the bacteria to survive and successfully decompose waste material. Emphasis upon the aerobic action, as opposed to anaerobic bacterial action is preferred because aerobic bacteria decompose waste materials often without objectionable odors or the formation of objectionable gases. Aerobic bacteria need a constant supply of oxygen on which to thrive, and therefore, such aerobic systems require continuous replenishment of dissolved oxygen consumed by the aerobes in the waste material. Additionally, agitation is necessary to prohibit waste particles from settling out to resist bacterial decomposition and form a continual buildup of sludge in septic tanks and the like.

These requirements of aerobic systems have given rise to numerous mechanical aerators and agitators, including designs similar to those used in commercial sewage treatment plants. For example, devices have been designed to aerate the material by rotating paddle wheels or the like which operate to either beat air into the material while moving it in the reservoir or to at least partially throw the material into the air. Other designs have incorporated separate means for moving the material in the reservoir and have introduced air by pumping compressed air through permeable "air stones" positioned at the bottom of the reservoir. The air stones are adapted to break the air into bubbles which enter the waste material. Bubbles are preferred over a stream of air passing through the material because the ratio of surface area to volume is greater and enables the oxygen to be more easily dissolved in the material. The proper functioning of an aerobic system is, of course, dependent upon the quantity of dissolved oxygen that is present within the waste material. It is seen that more power would be consumed by injecting larger than necessary quantities of oxygen into the material and, therefore, economic considerations are important in the manner in which oxygen is introduced. Another important economic consideration involves the manner in which the material is moved around or circulated within the reservoir.

A prior invention of mine, U.S. Pat. No. 3,778,233, relates to an improved device for aeration used primarily in confinement livestock operations to aerate sludge pits used in conjunction with the same. While that device works fine under the circumstances of confinement feeding operations for livestock, such as hogs, there are limitations with use of such a device in conjunction with septic tanks that are used for storing human waste.

One of the problems with sewage disposal plants, and septic tank plants are that often the disposal system finds itself "contaminated" with non-organic non-biodegradable waste materials such as band-aids, sanitary napkins, disposable diapers, condoms, and other material that people often discard into the lines of a sewage system. These adulterating materials can be drawn into the propeller of an aeration device such as that described in my previous U.S. Pat. No. 3,778,233. As a result, the propeller often will become entangled in these materials, and the materials will plug the air tube lines. As a result, aeration is not successfully achieved, and at best the sludge material is simply generally stirred or agitated by the propeller with little effect on biodegradation. There is, therefore, a continuing need for an improved aeration device of the general type disclosed in my previous U.S. Pat. No. 3,778,233, but of a design which is improved so that it can be used successfully for aeration in septic tanks that contain the above-referred to "contaminating" non-organic, non-biodegradable waste materials.

The development of such a device would mean that septic tanks can be conveniently converted into aeration units so that aerobic bacteria may decompose the material within the septic tanks, such that it can be successfully used for uses such as yard fertilizer, etc.

A primary objective of the present invention is to provide an improved aeration device of the type generally shown in my U.S. Pate. No. 3,778,233, but structurally modified so that it can be used for successful aeration of septic tanks.

Another objective of the present invention is to provide an aeration device which provides fine bubbles for aeration of septic material, even when used in septic tanks that contain high levels of contaminating materials such as non-biodegradable plastic and rubber materials.

An even further objective of the present invention is to provide an aeration device which will keep the dissolved oxygen content in septic tanks between 6 ppm and 10 ppm at all times to allow immediate conversation of all sizes of organic material particles by aerobic bacteria.

An even further objective of the present invention is to provide an aeration device which allows a home septic tank to be inexpensively converted into an aeration unit for decomposition of human organic waste material.

In even further objective is to provide a method for aerating septic tanks containing human organic waste materials.

The method and means of accomplishing these as well as other objectives of the invention will become apparent from the detailed description of the invention which follows hereinafter.

SUMMARY OF THE INVENTION

An improved aeration device for septic tanks is provided. It has an elongated shaft having upper and lower ends. In operational position, the upper end of the elongated shaft is positioned above the sewage level in the septic tank. Power means is associated with the upper end for rotation of the shaft. The shaft has a concentrically positioned air tube for drawing ambient air from the upper end downwardly to the lower end. The lower end has an associated propeller. The improvement comprises a guard bushing positioned adjacent the lower end of the air tube with air holes to allow free escape of air bubbles into agitated waste material to aerate the same. The guard bushing with air holes prevents non-organic wasted alterants such as non-biodegradable plastic and synthetic rubber materials from being drawn into the propeller or plugging the air tube outlets through which the fine air bubbles are dispersed.

BRIEF DESCRIPTION OF THE DRAWINGS

FIG. 1 is a perspective view of a septic tank in conjunction with a fertilizer holding tank, with the septic tank being used with the aeration device of the present invention.

FIG. 2 is a sectional view through the septic tank showing the directional flow of materials when using the aeration device of the present invention.

FIG. 3 is an elevated view in partial section of the aeration device of the present invention.

FIG. 4 is a sectional view along line 4—4 of FIG. 3 showing the concentric relationship of the air tube, guard tube, and the bushing mounts for the associated motor.

FIG. 5 shows an end view along line 5—5 of FIG. 4, showing the detail of the propeller bushing and the mounting of the propeller on the rotatable shaft of the aeration device.

DETAILED DESCRIPTION OF THE INVENTION

Looking first at FIG. 1, it shows a conventional septic tank 10 fluidly connected via pipe 12 to associated fertilizer holding tank 14. In addition, septic tank 10 has a sewage inlet line 16. Sewage is filling tank 10 up to the level represented by line 18. The aeration device of the present invention is represented in FIG. 1 at 20.

The details of the improved aeration device 20 of the present invention are shown in FIGS. 3, 4 and 5. The device 20 can be used in conjunction with an electric timer 22 which is electrically connected to the aeration device on/off switch 24 via electrical wires 26 and 28. Timer 22 has an electrically associated on/off light 30. In addition the device has an associated air filter 32 to allow ambient air to be drawn into the aeration device. The aeration device 20 is comprised of an electric motor 34 having an output motor shaft 36 which is connected to an elongated shaft 38 such that shaft 38 will rotate with motor shaft 36. Motor 34 is mounted in casing 40 via bushings 42. Bushings 42 holds motor 34 in a slightly elevated position on casing 40 to allow free air flow along the lines of directional arrows 44 and 46. At the lower end of shaft 38 is an axial thrust propeller 48. Thus, operation of the motor 34 rotates the shaft 38 and propeller 48 within the sludge material, moving it around the horizontal flow path indicated by directional arrows 50 of FIG. 2.

In addition to light 30, the unit may also have an audible indicator 31. This horn 31 is electrically connected to motor 34 to read the amperage of motor 34. A microprocessor (not depicted) records the starting amperage and the steady state amperage, after water is evacuated from tube 52. Any change from the steady state condition is sensed and an alarm from horn 31 is actuated to warn the operator that for some reason the unit needs to be checked. This assures that at all times during operation, successful aeration is occurring.

The same sensing of change in steady state operation may be accomplished by other sensors. For example, one could use a light source, a mechanical sensor such as a thermocouple, or a sensor source to sense the water level in tube 52 for steady state conditions and to sense any change away from steady state.

Concentrically positioned around shaft 38 is an elongated hollow air tube 52. Thus, when propeller 48 is rotating, air is drawn along the lines indicated by directional arrows 44 and 46 into the space between shaft 38 and air tube 52 and flows downwardly as indicated by arrows 54 and 56. At the interface between rotating propeller 48 and the downwardly moving air 54 and 56, an extreme amount of agitation and disruption occurs such that the air is pulled through air holes 60 in bushing 58 into the sewage material and septic tank 10 in the form of extremely small air bubbles. This provides the maximum amount of aeration since the smaller the bubbles the more the exposure of sludge material to the oxygen. Generally, with the device of this invention the dissolved oxygen content in the septic tank can be kept between 6 ppm and 10 ppm at all times, which is sufficient to convert immediately all soluble organic material into digested waste material suitable for transfer to hold tank 14 and ultimate use as a fertilizer material which contains nitrates and phosphates and extremely fine particles of non-biodegradable solids.

Turning back to the construction of the aeration device of the present invention, air tube 52 allows air to be pulled downwardly when propellar 48 turns. Air tube 52 extends downwardly slightly longer than the terminus of propeller 48. In actual operation, bushing 58 with air holes 60, coacts with the end of air tube 52 to prevent contaminating foreign materials which are non-biodegradable plastic materials, synthetic rubber materials, etc. from interfering with the small bubble action of propeller 48. As illustrated in FIG. 5, propeller 48 is mounted to the end of shaft 38 via propeller bushing 58. Propeller bushing 58 has air holes 60 to allow air to be forced into the sewage material.

In actual operation the unit is operated by timer 22 to run on an on/off cycle as recommended, depending upon the conditions in septic tank 10. Generally for household septic tanks on/off times of ten minutes on and twenty minutes off are suitable operational periods. When the unit is energized and electric motor 34 is operating, the unit operated in the following manner. Motor 34 causes motor shaft 36 to rotate. Since motor shaft 36 is connectively coupled to shaft 38 it likewise rotates. Rotation of shaft 38 causes propeller 48 to rotate. Air or oxygen flows through the gaps caused by bushings 42 via directional arrows 44 and 46 down into the space of air tube 52, concentrically positioned around shaft 38. The air or oxygen flow moves downward to the backside of propeller 48. At propeller 48 the moving thrust of the downwardly moving air interfaces with the sludge material, and the high degree of agitation results in a fine mist of air bubbles being dispersed throughout sludge in septic tank 10. Material in septic tank 10 generally moves along the lines indicated in directional arrows 50.

During operation the coaction of the location of the propeller with regard to the end of the air tube, and the action of bushing 58 in combination with air holes 60 coact to prevent adulterating or contaminating material from being drawn into propeller 48 and from plugging the air lines associated with air tube 52. As a result, non-organic waste adulterants such as non-digestible plastic or rubber materials that might be present in septic tank 10 do not interfere at all with operation of the unit which freely operated regardless of these materials to dispense micro-sized bubbles into the sludge and to freely circulate and agitate the sludge material to maximize the operation of aerobic bacteria.

It therefore can be seen that the invention accomplishes at least all of its stated objectives. It goes without saying, certain modifications to the construction and operation can be made and still employ the basic concept and operational features of the invention. It is intended that those modifications be included within the claimed invention as hereinafter defined. For example, while the inventor's construction of the present invention has used hardened polymeric plastic materials for the air tube and the guard tube, it is obvious that metals or other suitable materials could also be employed.

What is claimed is:

1. An improved aeration device for septic tanks and the like, comprising:

an elongated shaft having upper and lower ends;

power means associated with the upper end of said shaft for rotating said shaft;

an axial thrust propeller rigidly attached to said shaft for rotation therewith;

an air tube surrounding said shaft for drawing ambient air from around the upper end of said shaft downwardly around said propeller when said propeller rotates in septic waste material to provide fine air bubbles;

a guard bushing concentrically positioned in said air tube to allow free escape of air bubbles into agitated septic waste material to aerate the same, but to also prevent non-organic waste adulterants such as non-biodegradable plastic and rubber materials from being drawn into said propeller.

2. The aeration device of claim 1 wherein said power means is mounted to said device in such a manner to provide an air gap between the power means and the associated elongated shaft.

3. The aeration device of claim 1 which has a associated on/off timer to operate said power means in cycles.

4. The aeration device of claim 3 which an on/off light is associated with said timer for visual determination of whether said unit is operating.

5. The aeration device of claim 1 wherein said air tube extends outwardly farther than the terminus of said propeller to maximize the efficient operation of said aeration unit.

6. The aeration device of claim 5 wherein said propeller is mounted to said elongated shaft via a bushing means having air gaps for free flow of air down said air tube to said propeller.

7. The device of claim 1 which has an associated sensor means for sensing steady state operating conditions.

8. The device of claim 7 which has an alarm signal for warning of change in steady state operating conditions.

* * * * *